United States Patent [19]

Busemann

[11] 4,363,946

[45] Dec. 14, 1982

[54] INDUCTOR FOR INDUCTIVELY HEATING RACEWAYS OF ANTIFRICTION BEARING RINGS

[75] Inventor: Eduard Busemann, Lippstadt, Fed. Rep. of Germany

[73] Assignee: Hoesch Werke Aktiengesellschaft, Dortmund, Fed. Rep. of Germany

[21] Appl. No.: 154,277

[22] Filed: May 29, 1980

Related U.S. Application Data

[63] Continuation of Ser. No. 928,561, Jul. 27, 1978, abandoned.

[30] Foreign Application Priority Data

Aug. 3, 1977 [DE] Fed. Rep. of Germany ....... 2734916

[51] Int. Cl.³ .......................... H05B 6/14; H05B 6/40
[52] U.S. Cl. .............................. 219/10.59; 219/10.43; 219/10.79
[58] Field of Search ............... 219/10.59, 10.57, 10.43, 219/10.41, 10.79; 266/129; 148/147

[56] References Cited

U.S. PATENT DOCUMENTS

| | | | |
|---|---|---|---|
| 2,397,629 | 4/1946 | Stevens | 219/10.43 |
| 2,512,893 | 6/1950 | Gehr | 219/10.79 |
| 2,521,699 | 9/1950 | Denneen et al. | 219/10.59 X |
| 3,336,459 | 8/1967 | Seulen et al. | 219/10.43 |
| 3,593,973 | 7/1971 | Dehn | 219/10.59 |
| 3,659,069 | 4/1972 | Balzer et al. | 219/10.79 |
| 3,846,609 | 11/1974 | Enk | 219/10.79 |
| 3,914,572 | 10/1975 | Jensen | 219/10.43 |

FOREIGN PATENT DOCUMENTS

| | | | |
|---|---|---|---|
| 1483016 | 9/1971 | Fed. Rep. of Germany | 219/10.79 |
| 2205513 | 8/1973 | Fed. Rep. of Germany | 219/10.79 |
| 1237558 | 6/1960 | France | 219/10.43 |

*Primary Examiner*—B. A. Reynolds
*Assistant Examiner*—Philip H. Leung
*Attorney, Agent, or Firm*—Becker & Becker, Inc.

[57] ABSTRACT

A method of and inductor for inductively heating a nose or projection and its transition areas, which nose or projection serves as raceway surfaces and extends around an anti-friction bearing ring and has a rectangular cross section. The inductive heat supply is effected uniformly and simultaneously on all raceway surfaces to be hardened with an increase in the induction field in the transition area by varying the coupling distance and by employment of concentrators known per se.

2 Claims, 2 Drawing Figures

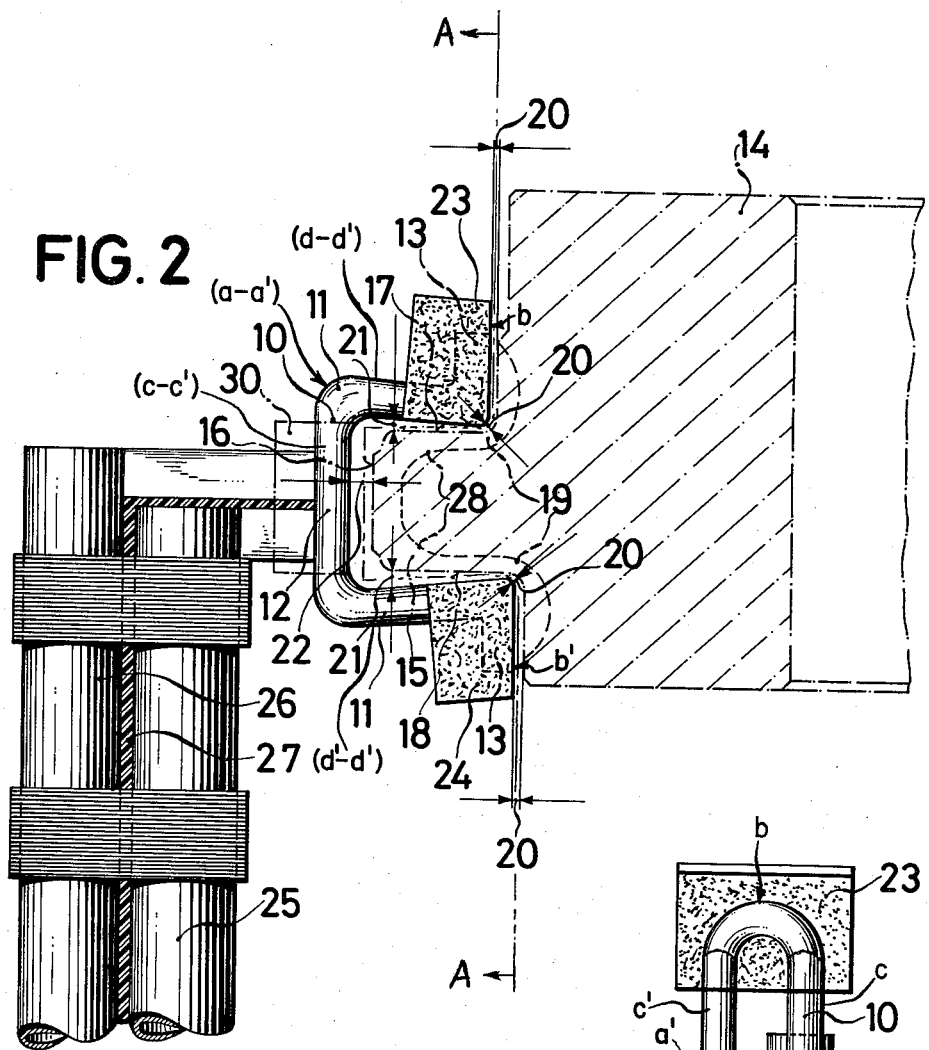

INDUCTOR FOR INDUCTIVELY HEATING RACEWAYS OF ANTIFRICTION BEARING RINGS

This is a continuation of application Ser. No. 928,561-Busemann filed July 27, 1978, now abandoned.

The present invention relates to a method of and inductor for inductively heating a nose and its transition area which nose has raceway surfaces extending around an antifriction bearing ring and has a substantially rectangular cross section.

With antifriction bearing rings for three-row antifriction bearings, the raceway surfaces on the raceway rings are hardened if this is necessary for obtaining the necessary life span of the bearing. Large antifriction bearing ring cross sections are surface hardened because with the dimensions involved in such rings a hardening all the way through is economically not feasible.

With an antifriction bearing nose ring, the raceway surfaces of the three rows of antifriction bodies are located in a U-shaped manner directly adjacent to each other. This arrangement results in a circular nose having a cross section of about from 5-15% of the antifriction bearing ring, said nose projecting from the remaining portion of the antifriction bearing ring. The transition areas of the nose to the antifriction bearing ring are formed by recessed transition radii. The raceway surfaces are in a manner known per se heated inductively and are hardened by subsequent quenching. According to heretofore employed methods, the individual raceway surfaces are individually hardened in the following succession: radial raceway surface, axial holding surface, and axial supporting surface.

In view of the succession of a plurality of heat treatments at different areas of the nose, considerable interior stresses build up in the nose with this method, and in particular in the transition areas toward the antifriction bearing ring. These inner stresses or tensions lead to a more or less strong tilting of the nose toward the antifriction bearing ring. This inclined position of the nose by tilting must again be eliminated by subsequent grinding with increased removal of material. In an extreme instance, this may bring about that the necessary depth of hardness is no longer present. The interior stresses or tensions in the nose may even be so great that tears occur in the first hardened raceway surfaces, which tears later may bring about a permanent break or tear. These heretofore known methods therefore are unsatisfactory.

It is, therefore, an object of the present invention to provide a method for inductively heating a nose and its transition areas which nose extends around an antifriction bearing ring and comprises raceway surfaces, which method will assure a uniform and simultaneous heat supply to all raceway surfaces to be hardened as well as to the transition areas nose-antifriction bearing ring.

These and other objects and advantages of the invention will appear more clearly from the following specification in connection with the accompanying drawings, in which:

FIG. 1 is an elevational view of an inductor taken along line A—A in FIG. 2; and FIG. 2 is a side view and fragmentary section view of the inductor in connection with an antifriction bearing-nose ring.

A uniform and simultaneous heat supply in combination with a uniform cooling brings about the advantage that a uniform surface hardening can be obtained and while the occurring inner stresses will not cause any deformations and overheating of the nose.

For inductively heating, it is known for instance from German Auslegeschrift 14 83 016 so to design the inductor, the heating head, that its shape corresponds to the surfaces to be hardened and that for increasing the intensity of the induction field, electro sheets are arranged within the region of the surfaces to be hardened. Also the problem of avoiding the undesired partial overheating has heretofore been solved according to German Auslegeschrift 22 05 513 by providing a controllable partial water cooling.

Such differentiated cooling, however, disadvantageously acts upon the course of the hardening action and the uniform surface hardness. Moreover, as a result thereof, different inner stresses or tensions are generated.

It is also known to influence the intensity of the inductive heat flow by orienting the magnetic field, which generates the heating in the workpiece, in a desired direction. In this connection, the coupling distance, i.e. the spacing between the current conductor and the workpiece is of great importance. More specifically, the said coupling distance should be as small as possible and should vary as little as possible during the operation. In this connection, reference may be had to German Auslegeschrift 14 83 016.

The problem underlying the present invention has been solved by causing the inductive heat supply to occur uniformly and simultaneously on all raceway surfaces to be hardened by means of increasing the induction field in the transition area by varying the coupling distance and by employment of concentrators known per se.

With the inductor provided for practicing the method according to the invention, in view of the suggested features, an induction coil or induction loop is employed which is U-shaped in cross section and is provided with outwardly angled-off flanges which at the free ends of the slightly inwardly inclined legs of said induction coil or induction loop carry concentrators. If the antifriction bearing rings are such which are provided with a particularly large cross section including the surrounding nose, the inductor is modified in such a way that in addition, within the region of the web interconnecting the two legs of said U-shaped induction coil or induction loop, there is provided a further concentrator.

Referring now to the drawing in detail, the arrangement according to the present invention comprises an induction coil 10 having an approximately U-shaped cross section with slightly inwardly inclined legs 11 which are interconnected by a web 12. At the free ends of said induction coil 10 the latter has outwardly angled-off flanges 13. This induction coil 10 either partly or entirely extends around a nose 15 which is spaced from the induction coil 10 and forms a part of and extends around an antifriction bearing ring 14. FIG. 2 shows the induction coil 10 as a ring sector extending only over a circular section of nose 15. In this instance, the bearing ring is turned during the application of induction heat. However, if desired, especially when relatively small diameter antifriction bearing rings are involved, the induction coil may form a complete ring, in which instance, of course, provisions customary in such circumstances are made to be able to place the coil 10 over and around the nose 15. The nose 15 has a substantially rectangular cross section, while the confining surfaces of said nose partially respectively serve as raceway surfaces 16, 17, 18 for three rows of antifriction bodies. Thus, the raceway surface 16 supports the antifriction bodies which transmit the radial forces, and the raceway surfaces 17, 18 are designed as axial holding and supporting raceways.

Another way to describe the induction coil 10 shown in FIGS. 1 and 2 is to view the induction coil as a torodial conductor made from two U-shaped sections a and a', only one of which is seen in FIG. 2, the other U-shaped section being hidden by the first U-shaped section. As is seen in FIG. 1, the two U-shaped sections are joined by U-shaped bights b and b'. The U-shaped section a and a' each include straight bights c and c' and pairs of legs d—d and d'—d' which legs converge toward one another. Localized flux concentrators 23 and 24 are mounted on the U-shaped bights b and b'.

The coupling distance, i.e. the distance between the workpiece and the inductor, is not kept constant. A variation of this coupling distance influences the intensity of the induction field so that it becomes necessary to provide such a change in the coupling distance if a uniform and simultaneous heat supply is required for all raceway surfaces to be hardened. In such an instance, in the transition area 19 of nose 15 and of antifriction bearing ring 14, the coupling distance 20 is the shortest and is retained within the region of the angled-off flanges 13. The coupling distance 21 between the legs 11 and the corresponding raceway surfaces 17, 18 of nose 15 gradually increases from the transition area 19 on and thus necessitates the slightly inwardly inclined legs 11. The coupling distance reaches its maximum value 22 within the region of the web 12. According to the specific embodiment shown, the coupling distances range from 1 mm to 4 mm. However, they change in conformity with the requirements concerning hardness of the raceway surfaces 16, 17, 18 of the cross section of nose 15 and with regard to the material involved.

In order to realize an increase in intensity of the induction field, concentrators 23, 24 are provided on the flanges 13. For such concentrators, electro sheets, dynamo sheets, transformer sheets or also high frequency sheets and high frequency iron may be used.

With noses of larger cross section in combination with larger antifriction bearing rings, in addition to the two concentrators 23, 24 on the flanges 13, also a further concentrator 30 indicated by dot-dash lines may be provided in the region of the web 12.

Through an inlet pipe 25 and a discharge pipe 26, which are separated by an insulation 27, the cooling and supply of energy of the induction coil connected thereto is effected. Coppper may be employed as material for the inlet and discharge pipes as well as for the induction coil. The induction coil 10 has only one winding as is customary with induction hardening of induction coils having an intermediate frequency.

The course of the hardening zone as it results from employment of the method according to the invention and when employing conductors is indicated for instance by the hardening-depth-line 28.

As will be evident from the above, the advantages realized by the present invention consist primarily in that during the hardening of the surrounding noses of rectangular cross section on antifriction bearing rings, no inner stresses will occur any longer which are so different and have such a strength that the noses deforms relative to the antifriction bearing ring, in other words, that hardening tears in the nose or in the transition area from the nose toward the antifriction ring occur.

Furthermore, in contrast to the hardening of raceway surfaces on noses of antifriction bearing rings according to which the different raceway surfaces are hardened individually one after another, the present invention has the advantage that the heat supply occurs simultaneously to all raceway surfaces to be hardened while a saving in the hardening time is obtained which amounts to approximately 60%. Moveover also a considerable saving in energy is realized which surprisingly partially requires less energy than is necessary for hardening of one single raceway surface in conformity with heretofore known methods.

It is, of course, to be understood that the present invention is by no means limited to the specific method set forth above and the specific showing in the drawing, but also comprises any modifications within the scope of the appended claims.

What is claimed is:

1. Inductive heating apparatus in combination with a bearing ring, the inductive apparatus being specifically for heating inductively low friction planar bearing surfaces and transition areas adjacent to the bearing surfaces on the bearing ring in order to harden the bearing surfaces without distortion, wherein the bearing surfaces are on a substantially rectangular projection on the inner surface of the bearing ring and include an axial bearing surface and parallel radial bearing surfaces, the transitional areas being areas on the inner surface of the bearing ring adjacent to the projection, the combination comprising:

a toroidal inductor formed of two opposed and parallel U-shaped sections joined by U-shaped bights wherein each U-shaped section includes a straight bight and a pair of legs depending therefrom which legs converge toward one another before termination in the U-shaped bights which join the legs of the U-shaped sections, and localized flux concentrators mounted on the U-shaped bights to increase the intensity of the field adjacent to the bights;

wherein, the straight bights are juxtaposed with the axial bearing surface of the projection, the legs are juxtaposed with the parallel radial bearing surfaces of the projection and the U-shaped bights extend adjacent to the transitional areas on the inner surface of the ring, whereby hardening due to induction heating occurs simultaneously to all bearing surfaces and to the transitional area thus avoiding stress distortion between the projection and transitional area due to localized heating thereof.

2. The combination of claim 1 wherein the spacing between the straight bight sections and axial bearing surface is greater than the spacing between the legs and radially extending bearing surfaces and wherein the spacing between the U-shaped bights and transitional areas is less than that between the legs and radially extending bearing surfaces.

* * * * *